US011449267B1

(12) United States Patent
Rehmeyer et al.

(10) Patent No.: US 11,449,267 B1
(45) Date of Patent: Sep. 20, 2022

(54) DETERMINATION OF DURATIONS OF MEMORY DEVICE TEMPERATURES

(71) Applicant: Micron Technology, Inc., Boise, ID (US)

(72) Inventors: James S. Rehmeyer, Boise, ID (US); Anthony D. Veches, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/243,357

(22) Filed: Apr. 28, 2021

(51) Int. Cl.
*G06F 3/06* (2006.01)

(52) U.S. Cl.
CPC .......... *G06F 3/0653* (2013.01); *G06F 3/0614* (2013.01); *G06F 3/0679* (2013.01)

(58) Field of Classification Search
CPC .... G06F 3/0653; G06F 3/0614; G06F 3/0679; G06F 11/30; G06F 11/3058; G06F 1/3203; G06F 1/3275; G06F 1/3206; G06F 1/3225; G06F 1/3243; G06F 1/3234; G11C 11/406; G11C 11/40615; G11C 11/4061
See application file for complete search history.

(56) References Cited

U.S. PATENT DOCUMENTS

| | | | |
|---|---|---|---|
| 6,480,982 B1 | 11/2002 | Chan et al. | |
| 9,786,352 B2 * | 10/2017 | Yoshida | ............ G11C 11/40626 |
| 2003/0126354 A1 | 7/2003 | Kahn et al. | |
| 2003/0231540 A1 * | 12/2003 | Lazar | ................ G11C 11/40603 |
| | | | 365/222 |
| 2007/0204175 A1 * | 8/2007 | Henson | .................. G06F 1/3203 |
| | | | 713/300 |
| 2011/0188283 A1 | 8/2011 | Chevallier et al. | |
| 2011/0188284 A1 | 8/2011 | Chevallier et al. | |
| 2012/0033519 A1 * | 2/2012 | Confalonieri | ...... G11C 16/3431 |
| | | | 365/222 |
| 2012/0311228 A1 | 12/2012 | Hsu et al. | |
| 2017/0322611 A1 * | 11/2017 | Brennan | ............. G06F 12/0868 |
| 2019/0220397 A1 | 7/2019 | Lee | |

OTHER PUBLICATIONS

S. Liu, B. Leung, A. Neckar, S. O. Memik, G. Memikand N. Hardavellas, "Hardware/software techniques for DRAM thermal management," 2011 IEEE 17th International Symposium on High Performance Computer Architecture, 2011, pp. 515-525, doi: 10.1109/HPCA.2011.5749756. (Year: 2011).*

D. Li, Kaicheng Zhang, A. Guliani and S. Ogrenci-Memik, "Adaptive thermal management for 3D ICs with stacked DRAM caches," 2017 54th ACM/EDAC/IEEE Design Automation Conference (DAC), 2017, pp. 1-6, doi: 10.1145/3061639.3062197. (Year: 2017).*

* cited by examiner

*Primary Examiner* — Khoa D Doan
(74) *Attorney, Agent, or Firm* — Brooks, Cameron & Huebsch, PLLC (57) ABSTRACT

Methods, systems, and apparatuses related to determination of durations of memory device temperatures are described. For example, a controller can be coupled to a memory device to monitor an operating temperature of the memory device. The controller can determine the operating temperature exceeds a threshold temperature. The controller can determine a duration that the temperature exceeds the threshold temperature. The controller can provide data corresponding to the operating temperature and the duration to a requesting device.

18 Claims, 4 Drawing Sheets

DETERMINATION OF DURATIONS OF MEMORY DEVICE TEMPERATURES

TECHNICAL FIELD

The present disclosure relates generally to semiconductor memory and methods, and more particularly, to apparatuses, systems, and methods for determination of durations of memory device temperatures.

BACKGROUND

Memory devices are typically provided as internal, semiconductor, integrated circuits in computers or other electronic systems. There are many different types of memory devices including volatile memory devices and non-volatile memory devices. Volatile memory devices can require power to maintain data (e.g., host data, error data, etc.) and include random access memory (RAM), dynamic random access memory (DRAM), static random access memory (SRAM), synchronous dynamic random access memory (SDRAM), and thyristor random access memory (TRAM), among others. Non-volatile memory devices can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computer or other electronic system.

DETAILED DESCRIPTION

Methods, systems, and apparatuses relate to determination of durations of memory device temperatures. Different types of memory technology have distinct properties, such as capacity, hardware cost, latency and/or different thermal profiles during operation. Moreover, temperatures of memory systems and memory devices therein can vary (e.g., increase) during operation. For instance, respective temperatures of memory devices can increase depending on a load (e.g., a number and/or a type of memory operations) on the memory devices.

However, increased temperatures of the memory systems can contribute to the degradation of the memory systems (e.g., degradation of memory devices in the memory system). Such degradation can be exacerbated by remaining at the increased temperatures for an extended duration. Thus, a lifetime of a memory system may be prolonged by operating the memory system (e.g., processing commands) at a lower temperature and, notably, by limiting or accounting for a duration that the memory system is at an increased temperature.

Some previous approaches may monitor temperatures of a memory system, for instance, in an effort to operate at a lower temperature. Based on a monitored temperature such approaches may perform a subsequent operation (e.g., alter fan speed, alter an amount of bus traffic, etc.). Thus, such previous approaches may attempt to lower a temperature experienced at a given moment by a memory system. However, such approaches may not monitor or account for a duration that temperature exceeds a threshold temperature. Moreover, such approaches may not store monitored temperatures/durations and/or may be prone to loss of stored temperature/duration data (e.g., data loss in response to a power-off event).

Accordingly, the disclosure is directed to determination of durations of memory device temperatures. For instance, embodiments herein include determining a temperature of a memory device exceeds a threshold temperature and determining a duration that the temperature exceeds the threshold temperature. Various embodiments herein include storing data corresponding to the operating temperature and the duration (i.e., duration of time) the operating temperature exceeds the threshold temperature. For instance, the data can be initially stored in a register of a memory device and subsequently stored in a memory array (e.g., stored in a memory array of a non-volatile memory device) to ensure the data remains stored even in response to a power-off event.

Determination of durations of temperatures of memory devices can there improve memory system performance in comparison to approaches which do not account for durations of memory device temperatures and/or other approaches that are prone to loss of data in response to a power-off event. For instance, determination of durations of memory device temperatures can permit analysis and/or reconfiguration of the memory system (e.g., alteration of a characteristic of a memory system and/or memory device) based at least on the determined durations of the memory device temperatures. Embodiments herein can be applied in mobile memory deployments to further improve the reliability of a memory system deployed in a mobile computing architecture.

In the following detailed description of the disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the disclosure.

As used herein, designators such as "C," "P," "I," "S," etc., for example, particularly with respect to reference numerals in the drawings, indicate that a number of the particular feature can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of sound devices) can refer to one or more sound devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 140 can reference element "40" in FIG. 1, and a similar element can be referenced as 240 in FIG. 2. As will be appreciated, elements shown in the various embodiments herein can be added, exchanged, and/or eliminated so as to provide a number of additional embodiments of the disclosure. In addition, the proportion and/or the relative scale of the elements provided in the figures are intended to illustrate certain embodiments of the disclosure and should not be taken in a limiting sense.

Figure 1:
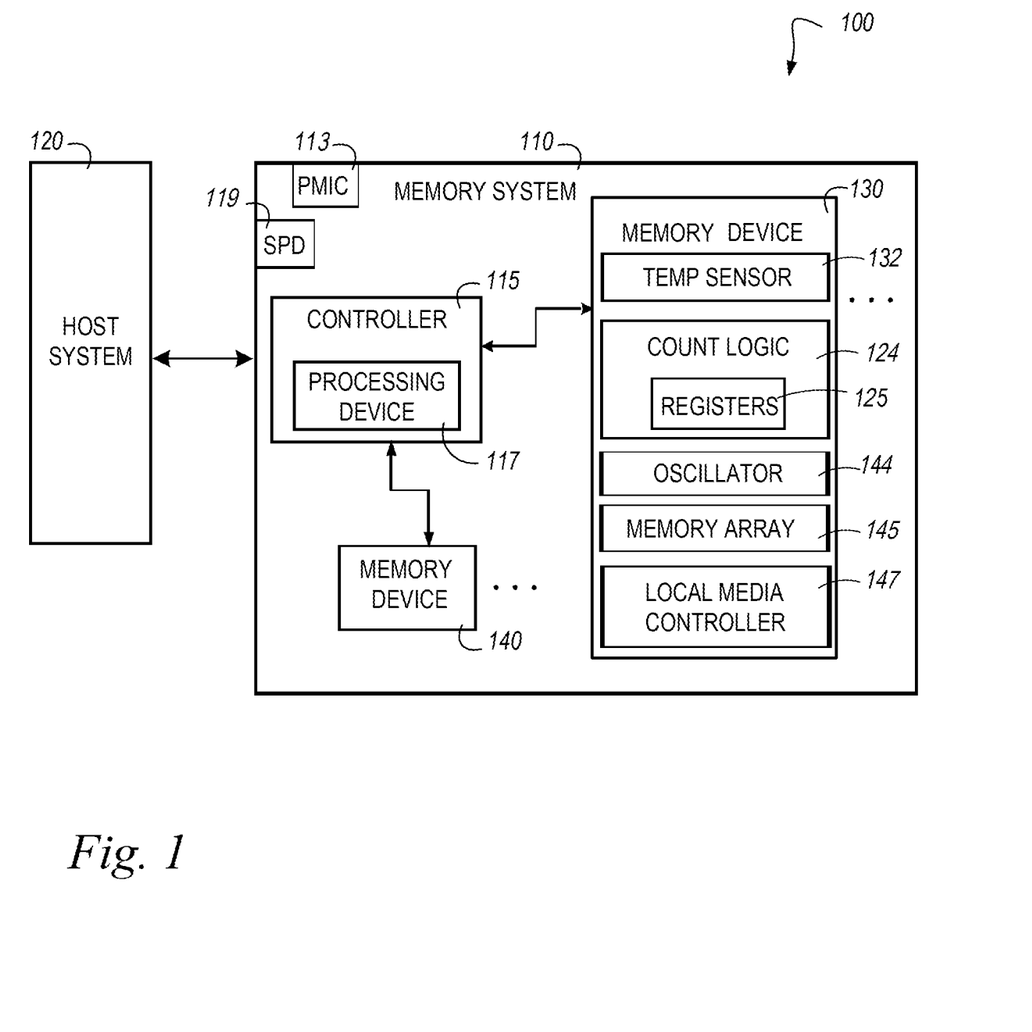
FIG. 1 illustrates an example computing system that includes a memory system in accordance with a number of embodiments of the disclosure.

FIG. 1 illustrates an example computing system 100 that includes a memory system 110 in accordance with a number of embodiments of the disclosure. As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can include a memory system 110 including a controller 115, first memory device 130, and a second memory device 140. However, in some embodiments, the computing system can include a memory system including a controller and the second memory device, in the absence of the first memory device as described in FIG. 2.

In some embodiments, the controller 115 can be configured to manage the first memory device 130 and/or can manage the second memory device 140. In some cases, the controller 115 can be a register clock driver (RCD), such as RCD employed on an RDIMM or LRDIMM.

The second memory device 140 and/or the first memory device 130 can provide main memory for the computing system 100 or can be used as additional memory or storage throughout the computing system 100. In some embodiments, the first memory device 130 can be a ferroelectric field-effect transistor (FeFET) memory device, a dynamic random-access memory (DRAM), ferroelectric random-access memory (FeRAM), or a resistive random-access memory (ReRAM) device, or any combination thereof.

Figure 2:
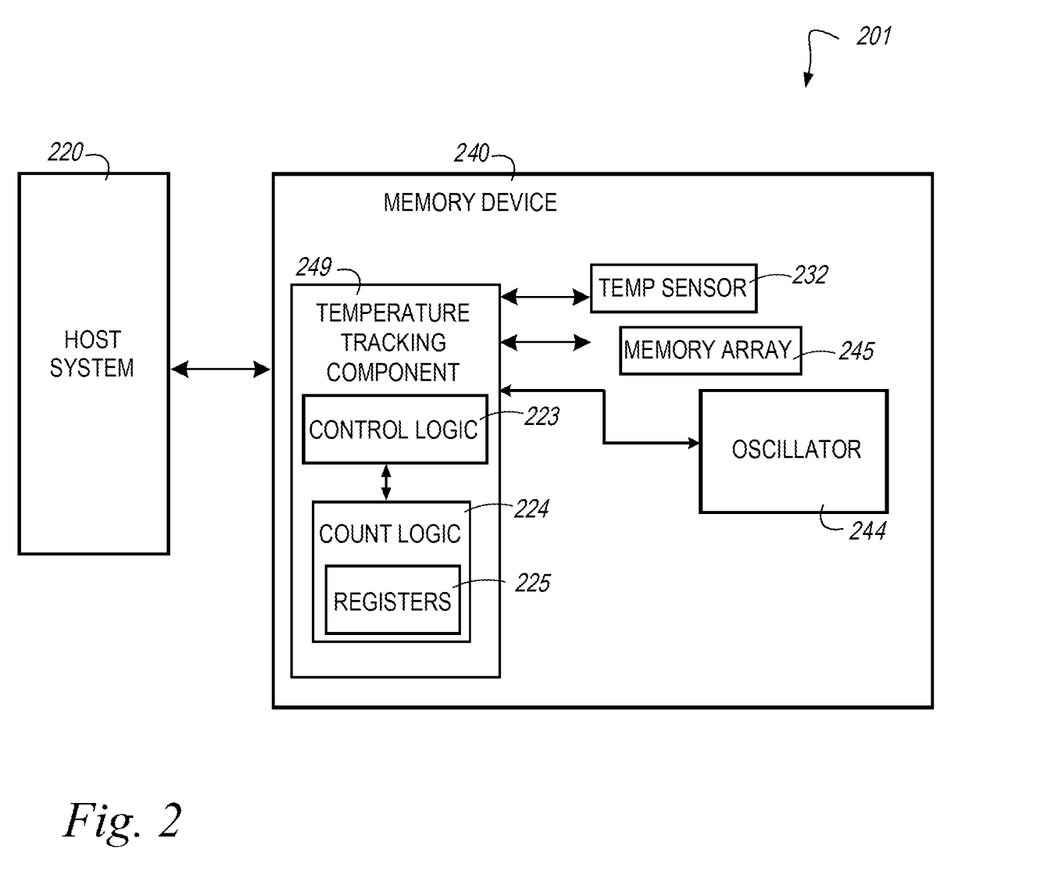
FIG. 2 illustrates another example of a computing system that includes a memory device in accordance with a number of embodiments of the disclosure.

The first memory device 130 and the second memory device 140 and can include one or more memory arrays of memory cells, e.g., volatile memory cells or non-volatile memory cells, respectively. For instance, the first memory device can include a memory array 145, while the second memory device can also include a memory array (e.g., non-volatile memory array 245 as illustrated in FIG. 2). In various embodiments, the first memory device 130 can include at least one array of volatile memory cells while the second memory device 140 can include at least one array of non-volatile memory cells. Embodiments are not limited to a particular type or number of memory devices. Although shown as two distinct memory devices 130, 140, it will be appreciated that one memory device or three or more devices, are contemplated within the scope of the disclosure.

The memory system 110 can be a hybrid of a storage device and memory module. Examples of the second memory device 140 include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). In some examples, the second memory device 140 can be a three-dimensional cross-point ("3D cross-point") storage device, which is a cross-point array of non-volatile memory cells. Examples of memory modules include a dual in-line memory module (DIMM) and/or a small outline DIMM (SO-DIMM).

The first memory device 130 and the second memory device 140 can include any combination of the different types of volatile memory devices and non-volatile memory devices. Examples of volatile memory devices can be, but are not limited to, random access memory (RAM), such as dynamic random-access memory (DRAM) and synchronous dynamic random-access memory (SDRAM). Examples of non-volatile memory devices can include, but are not limited to, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 (i.e., a host) that is coupled to one or more memory systems 110. In some embodiments, the host system 120 is coupled to different types of memory system 110. As used herein, "coupled to" or "coupled with" generally refers to a connection between components, which can be an indirect communicative connection (e.g., with intervening components) or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory system 110, for example, to perform a command. As used herein, the term "command" refers to an instruction from a memory system to perform a task or function. For example, the controller 115 of the memory system 110 can cause a processing device 117 to perform a task based on a given command. In some embodiments, a command can include a memory request. That is, a command can be a request to the read and/or write data from and/or to the memory device (e.g., the first memory device 130 and/or the second memory device 140). The host system 120 may, for example, write data to the memory system 110 and read data from the memory system 110 based on a command (e.g., memory request).

The host system 120 can be coupled to the memory system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory system 110. The host system 120 can further utilize an NVM Express (NVMe) interface to access components (e.g., first memory device 130, second memory device 140) when the memory system 110 is coupled with the host system 120 by the PCIe interface. The physical host interface can provide an interface for passing control, address, data, and other signals between the memory system 110 and the host system 120. In general, the host system 120 can access multiple memory systems via a same communication connection, multiple separate communication connections, and/or a combination of communication connections.

The controller 115 can communicate with the memory devices 130, 140 to perform operations such as reading data, writing data, or erasing data at the memory devices 130, 140 and other such operations. The controller 115 can include hardware such as one or more integrated circuits and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or other suitable processor.

In some embodiments, the controller 115 can be resident on the memory system 110 as illustrated in FIG. 1. However, while the example memory system 110 has been illustrated in FIG. 1 as including the controller 115, in another embodiment of the disclosure, a memory system 110 does not include a controller 115, and can instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the first memory device 130 and/or the second memory device 140. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the first memory device 130 and/or the second memory device 140. The controller 115 can further include host interface circuitry to communicate with the host system 120 via the physical host interface. The host interface circuitry can convert the commands received from the host system into command instructions to access the memory devices 130 and/or 140 as well as convert responses associated with the memory devices 130, 140 into information for the host system 120.

The controller 115 can be configured to store data and/or events, as described herein, in the count logic 124. The controller 115 can also be configured to modify data stored in the count logic 124. The count logic 124 can be internal to the controller 115 and/or external to the controller 115. For instance, as illustrated in FIG. 1, the count logic 124 is shown external to the controller 115. In instances where the count logic 124 is both internal and external to the controller 115, the count logic 124 can be configured to store certain types of data internally in the controller 115 and different types of data external to the controller 115. The controller 115 can delete and/or modify the data stored in the count logic 124. For example, the controller 115 can delete and/or modify the data stored in the count logic 124 after the data is accessed and/or stored elsewhere such as stored in a memory array of the second memory device 140. The controller 115 can delete and/or modify the data at intervals of time. The controller 115 can delete and/or modify the data at random.

The count logic 124 can store data associated with one or more temperature events. For instance, the count logic 124 can monitor temperatures responsive to respective occurrences of a plurality of temperature events. The temperature events can, in some embodiments, be instantiated based on a number of elapsed clock cycles between respective ones of the of temperature events. For instance, in some embodiments the elapsed clock cycles can correspond to or be based on a signal emitted by an oscillator 144. Thus, temperature events and resultant temperatures can be monitored periodically based on a signal emitted by the oscillator. In some embodiments, a number of elapsed cycles (and therefore an amount of time) between each of the respective ones of a plurality of temperature events can be the same. For example, following a given number of cycles a first temperature event can occur (and a first temperature can be monitored), following a subsequent iteration of a given number of cycles a second temperature event can occur (and a second temperature can be monitored), and so forth for a plurality of temperature events. For instance, in some embodiments a temperature event can be instantiated for each instance at which an oscillator emits a signal. For example, a temperature event can be instantiated for each instance at which a self-refresh oscillator emits a self-refresh signal. However, in some embodiment a temperature event can be instantiated on occurrence of a threshold number of oscillator signals (e.g., instantiating a temperature event responsive to every second, third, fourth, etc., signal emitted by an oscillator).

In various embodiments, the first memory device 130 and/or the second memory device 140 can be a type of memory that employs refreshing of the memory. For instance, the first memory device 130 and/or the second memory device 140 can be a DRAM and/or a FeRAM, among other types of memory that refresh data in the memory device. For instance, in some embodiments the first memory device can be a DRAM. In some embodiments, the second memory device can be a FeRAM.

The count logic 124 can comprise memory, such as registers 125, which can store data. The data can be stored as specific instances of data, or multiple instances of data can be stored in a same number of registers. For example, a first temperature and a second temperature can be stored in a first register and a second register included in the registers 125, respectively, or a representation of the first temperature and the second temperature can be stored in the first and second registers.

The data can be stored as encoded or unencoded data. For example, the data corresponding to the temperature of the memory system 110 can be stored in the count logic 124 as encoded or unencoded data. For example, multiple instances of encoded data can be processed by the controller 115 to generate a single encoded instance of the data which can be stored in the count logic 124.

Unencoded data provides unaltered data provided by a source of the unaltered data such as by a sensor generating the data. Encoded data provides data that is altered after being provided by sensors. In some examples, the encoded data can reduce the size of data as compared to unencoded data. For instance, temperature data can be provided using three or more bits while encoded data can be provided using one bit, among other examples. Encoding can comprise dividing the data into buckets using thresholds and assigning each bucket a bit-value. Temperatures above a threshold temperature can be encoded with a "0"-bit value while temperatures equal to or below the threshold temperature can be encoded with "1"-bit value. Encoded data can comprise more than one bit.

Multiple instance of data can be stored together by combining the values of the instances of data. For example, a medium or an average of a plurality of instances of temperature data can be calculated by the controller 115. The controller 115 can then store the calculated values combining multiple instances of data in one or more registers 125 of the count logic 124. In various embodiments, a determined temperature can be point temperature data or statistical temperature data generated from a plurality of point temperature data.

As detailed herein, a duration which a temperature exceeds a threshold temperature can, in some embodiments, be based on or equal to an elapsed amount of time between respective times associated with at least two temperatures of a plurality of temperatures. The respective times of the at least two temperatures can be stored in the registers 125 of the count logic 124. The respective times can refer to a current time associated with a temperature of the memory system 110. For instance, a first time in minutes/hours/seconds/etc. can be associated with a first temperature of the memory system and a second subsequent time can be associated with a second subsequent temperature of the memory system. In such instances, a duration can be equal to an amount of time elapsed between the first time and the second time. However, in some embodiments a duration can be based on or equal to a number of clock cycles such as a number of clock cycles of the oscillator 144.

In some embodiments, the temperature of the memory system 110 can be monitored by the temperature sensor 132. Examples of temperature sensors include those employing infrared (IR) sensors and/or those employ thermocouples and/or thermistors, among other types of temperature sensors.

In some embodiments, the temperature sensor 132 can be resident on a die. For instance, the temperature sensor 132 can be resident on a die along with the first memory device 130 and/or the second memory device 140. Stated differently, the temperature sensor 132 and the first memory device 130 and/or the second memory device 140 can be resident on the same die. In some embodiments, the temperature sensor 132 can be resident on a DIMM, among other possible locations for the temperature sensor 132.

The monitored temperature can correspond to a temperature of a memory cell, an array, a block, a device, and/or the memory system 110. For instance, the monitored temperature can be a temperature of the first memory device 130, a temperature of the second memory device 140, or a temperature of the memory system 110.

While illustrated as an individual temperature sensor 132, the memory system 110 can include a number of temperature sensors. In some embodiments, each first memory device 130 and/or second memory device 140 can have a respective temperature sensor. In such embodiments, temperatures can be monitored for each first memory device 130 and/or second memory device 140 by the respective temperature sensors. In some embodiments, temperatures can be monitored for each die and/or for each group of dice in a memory device.

The memory system 110 can include a serial presence detect (SPD) hub 119 or simply "hub". The SPD hub 119 can include a temperature sensor (e.g., such as temperature sensor 132), clock functionality, isolation circuitry (e.g., an ability to isolate a bus on the module, such as a bus from other buses or from the host system 120.

The memory system 110 can include a power management integrated circuit (PMIC) 113. The PMIC 113 can be configured to output one or more voltages for operation of the memory sub-system 110. The voltages to be output can be determined based on conversion of the PMIC supply voltage to one or more reduced voltages corresponding to voltages compatible with operation of one or more components of system 110, which can include controller 115, memory components such as the first memory device 130 and/or the second memory device 140, and/or circuitry associated therewith, such as control circuitry, input/output (I/O) circuitry, address circuitry, etc.

In some embodiments, an amount of voltage input and/or a voltage output from the PMIC 113 to the memory system 110 and/or the one or more components of the memory system 110 can be monitored. For instance, a voltage input and/or output from the PMIC can be monitored and compared to a voltage threshold to determine when a voltage is above/below the voltage threshold and/or to determine a duration of time the voltage is above/below the voltage threshold. Voltage information (e.g., whether the voltage is above/below the voltage threshold, etc.) can be stored herein similar to temperature data.

In some embodiments, the memory device 130 includes local media controller 147 that operates in conjunction with the controller 115 to execute operations on the memory array 145 of the memory device 130. In some embodiments, an external controller (e.g., controller 115) can externally manage the first memory device 130 and/or the second memory device 140.

The memory system 110 can also include additional circuitry or components that are not illustrated. In some embodiments, the memory system 110 can include a cache or buffer (e.g., DRAM) and address circuitry (e.g., a row decoder and a column decoder) that can receive an address from the controller 115 and decode the address to access, for instance, to the first memory device 130.

As discussed herein, the controller 115 can permit determination of durations of memory device temperatures to improve functioning of the memory system, in contrast to other approaches that do not perform determination of durations of memory device temperatures. For instance, the controller 115 can monitor, via a temperature sensor, temperatures of a memory device. For example, the controller 115 can receive, from the temperature sensor 132, an analog signal and/or data corresponding to temperatures of a memory device (e.g., the first memory device 130), among other possibilities.

Based on the monitored temperatures, the controller 115 can determine whether a monitored temperature exceeds a threshold temperature. The threshold temperature can be a predetermined value (e.g., 50 degrees Celsius) or can be an adjustable value. The threshold temperature can be stored in the count logic 124 or can be stored elsewhere such as in a fuse or other type of memory in the memory system 110.

In some embodiments, the memory system 110, the first memory device 130, and the second memory device 140 can have the same threshold temperature. However, in other embodiments, at least one of the memory system 110, the first memory device 130, and the second memory device 140 can have different threshold temperature. For instance, the first memory device 130 can have a first threshold temperature while the second memory device 140 can have a second threshold temperature that is different (e.g., higher or lower than) the first threshold temperature.

In some embodiments, the temperature threshold can be included in a plurality of temperature thresholds. In such embodiments a monitored temperature can be compared to one or more of the plurality of temperature thresholds. Responsive to a determination that a monitored temperature exceeds the one or more of the plurality of temperature thresholds, a duration of time can be determined that the monitored temperature exceeds the one or more of the plurality of temperature thresholds. For instance, when a monitored temperature exceeds two temperature thresholds such as first temperature threshold and a second temperature threshold, respective durations for both the first and second temperature thresholds can be determined.

The controller 115 can perform the memory operation using a memory device. For example, the controller 115 can cause a set of memory cells in the first memory device 130 to activate to write data to the first memory device 130 and/or the controller can cause the set of memory cells to activate to read data stored on the first memory device 130. As used herein, the term "activate" refers to the act of opening a row, set, and/or page to permit a read and/or write of data to the row, set, and/or the page once opened. For example, one or more row access commands can be asserted on a row, set, and/or page of memory cells to cause data (e.g., charges) stored by the memory cells to be read by circuitry associated with the first memory device 130. Similarly, the controller 115 can perform various memory operations such as write/read operations using the second memory device 140.

In various embodiments, the temperature of the first memory device 103 and/or the second memory device 140 can be sent and received during runtime execution of the application. As used herein, "runtime execution" of the application refers to the execution of instructions/code of the application by a processing device such as processing device on the host system 120. Thus, determination of durations of memory device temperatures herein can permit real-time alteration of characteristics of a memory system 110 and/or permit tracking and storage of real-time operational temperatures experienced by the memory system 110. In some embodiments, the controller 115 can perform some or all aspects of determination of duration of memory device temperatures during runtime execution of an application.

FIG. 2 illustrates an example computing system 201 that includes a memory device in accordance with a number of embodiments of the disclosure. The host system 220, the count logic 224, temperature sensor 232, the memory device 240, and the oscillator 244 can be analogous to the host system 120, the count logic 124, the temperature sensor 132, the memory device 140, and the oscillator 144, as illustrated in FIG. 1, herein.

In various embodiments, a temperature tracking component 249 can be communicatively coupled to the memory system 210 to perform aspects of determination of durations of memory device temperatures. The temperature tracking component 249 can include hardware such as one or more integrated circuits and/or discrete components, a buffer memory, or a combination thereof. The hardware can include digital circuitry with dedicated (i.e., hard-coded) logic to perform the operations described herein. For instance, the temperature tracking component 249 can include control logic 223 and/or count logic 224 to perform aspects of the determination of duration of memory device temperatures.

In various embodiments, the temperature tracking component 249 can monitor temperatures of the memory device 240. For instance, the temperature tracking component 249 can monitor temperatures of the memory device 240 via the temperature sensor 232. A temperature sensor such as the temperature sensor 232 can output an analog voltage and/or data that is representative of a temperature such as a temperature of the memory device 240.

The temperature tracking component 249 can monitor an analog signal output by the temperature sensor 232 and can determine a monitored temperature of a memory device such as memory device 240 based on the analog signal. The temperature tracking component 249 can compare the temperature of the memory device 240 to a temperature threshold. In some instances, the temperature tracking component 249 can determine a temperature of the memory device 240 exceeds a threshold temperature. For instance, the temperature tracking component 249 can compare a monitored temperature to a threshold temperature to determine the monitored temperature exceeds the threshold temperature.

Responsive to determining that a temperature exceeds the threshold temperature, the temperature tracking component 249 can determine a duration that the temperature exceeds the threshold temperature. For instance, the temperature tracking component 249 can monitor a total number of cycles (e.g., cycles of the oscillator 244) for which a temperature exceeds the threshold temperature. In this way, the duration the temperature exceed the threshold temperature can be equal to or inferred from the total number of cycles from which the temperature exceed the threshold temperature.

The temperature tracking component 249 can store in a register such as in the registers 225 of the memory device 240, data corresponding to the operating temperature and the duration of time the operating temperature exceeds the threshold temperature. For instance, the temperature tracking component 249 can store the data corresponding to the operating temperature and the duration that the operating temperature that exceeds the threshold temperature in the registers 225 in the count logic 224 and can, in some embodiments, subsequently store the data from the registers 225 elsewhere such as in the non-volatile memory array 245. For example, the temperature tracking component 249 can store data corresponding to the operating temperature and the duration that the operating temperature exceeds the threshold temperature in the registers 225 and in response to a power-off event, subsequently store the data in the registers 225 in the non-volatile memory array 245 of the memory device 240.

Figure 3:
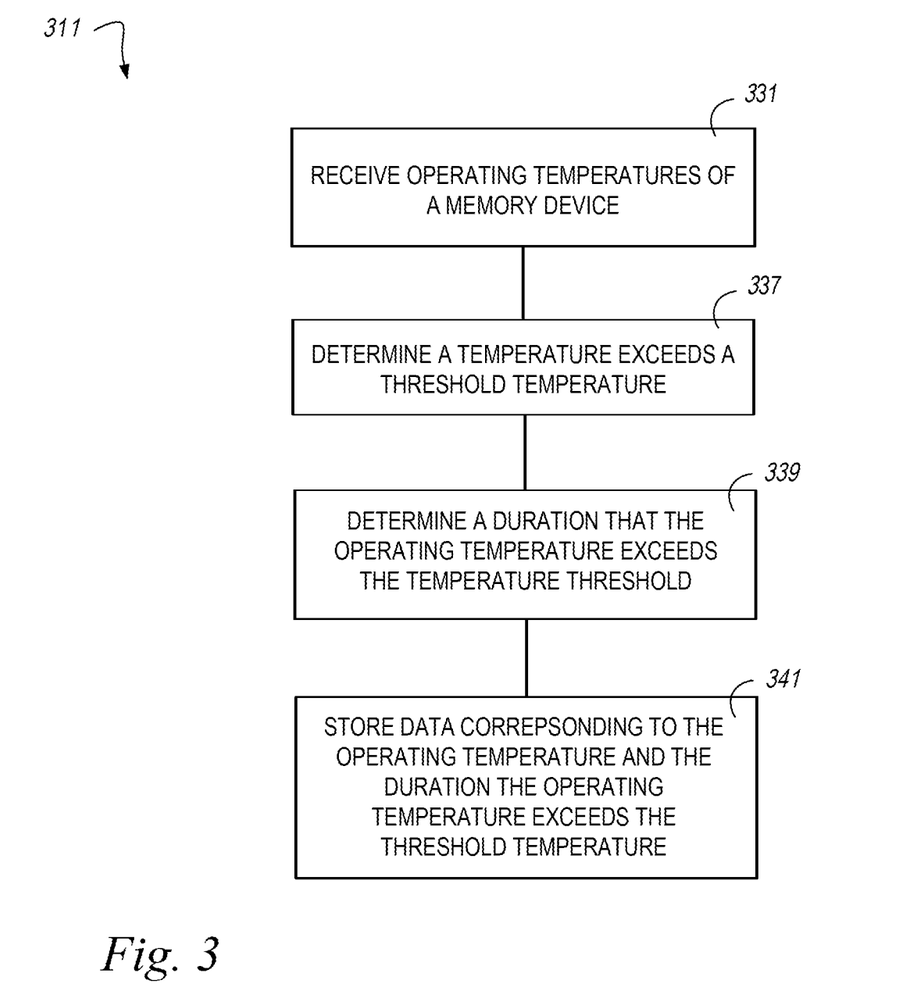
FIG. 3 illustrates a flow diagram corresponding to determination of durations of memory device temperatures in accordance with a number of embodiments of the disclosure.

FIG. 3 illustrates a flow diagram 311 corresponding to determination of durations of memory device temperatures in accordance with a number of embodiments of the disclosure. At 331, the flow diagram 311 includes receiving operating temperatures of a memory device. For instance, receipt of an operating temperature can include receipt of signaling indicative of data corresponding to a plurality of temperatures of the memory device. In some embodiments, receipt of an operating temperature and include receipt of signaling indicative of data corresponding to a plurality of temperatures of the memory device and/or data corresponding to respective times of occurrence of each temperature of the plurality of temperatures.

At 337, the flow diagram 311 can in response to receipt of the signaling indicative of the data at 331, determine a temperature of the plurality of temperatures exceeds a threshold temperature, as detailed herein. At 339, the flow diagram 311 can in response to determination a temperature exceeds a threshold temperature, determine a duration that a temperature exceeds the threshold temperature, as detailed herein.

At 341, the flow diagram 311 can store data corresponding the operating temperature and the duration the operating temperature exceeds the threshold temperature. In such embodiments, the data stored in a memory array of a non-volatile memory device in a persistent manner (e.g., remain stored in response to a power-off event). In various embodiments that data can be stored in the non-volatile memory device by performing read operation of data stored in a register and performing a subsequent write operation to store the data from the register in a memory array of the non-volatile memory device.

While described above an individual memory device and an individual memory device it is understood that the memory device can be included in a plurality of memory devices. In such examples, one or more of the plurality of memory devices can be selected to store data corresponding to the operation temperature and the duration the operating temperature exceeds the threshold temperature.

Figure 4:
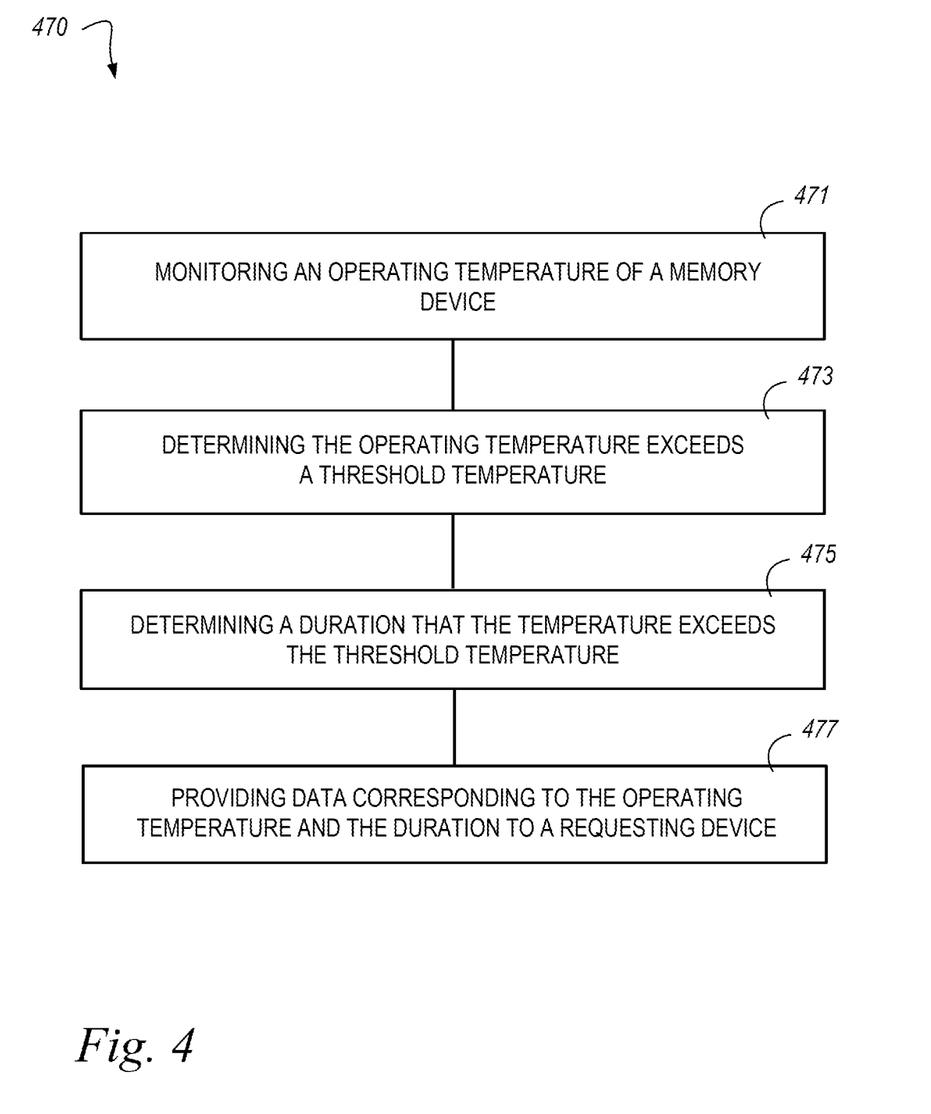
FIG. 4 illustrates a diagram representing an example method for determination of durations of memory device temperatures in accordance with a number of embodiments of the disclosure.

FIG. 4 illustrates a diagram representing an example method 470 for determination of memory device temperatures in accordance with a number of embodiments of the disclosure. As described in connection with FIG. 4, a computer system (e.g., computing system 100 can include a controller (e.g., the controller 115 of FIG. 1) and a processing device (e.g., the processing device 117 of FIG. 1). The controller can cause the processing device to perform aspects of determination of durations of memory device temperatures.

At 471, the method 470 describes the controller can monitor an operating temperature of a memory device. For instance, the controller can monitor the temperature of the memory device responsive to a command (e.g., responsive to a command from a requesting device) and/or responsive to performance of memory operation using the memory device.

At 473, the method 470 describes the controller can determine the operating temperature, as monitored at 471, exceeds a threshold temperature. For example, a first temperature (e.g., 52 degrees Celsius) associated with a first temperature event at a first time (t1) can exceed a threshold temperature (e.g., 45 degrees Celsius). Subsequent to the first temperature event, additional temperature events and corresponding temperatures can be determined. For instance, a second temperature (e.g., 51 degrees Celsius) associated with a second temperature at a second time (t2) can also exceed a threshold temperature. In this way, subsequent temperature events can occur until a temperature associated with a monitored temperature is less than the threshold temperature. For instance, subsequent to the first temperature and the second temperature, a third temperature (e.g., 43 degrees Celsius) associated with a third temperature event at a third time (t3) can be determined to be less than the threshold temperature. As such, a duration the temperature exceeds the threshold temperature can be equal to the difference between t3 and t1. The duration can be stated in terms of clock cycles (e.g., clock cycles of a host) and/or in terms of elapsed real time (i.e., real time or wall-clock time).

As mentioned, determining a duration a temperature exceeds a threshold temperature can improve memory system performance. For instance, in some embodiments, a characteristic of a memory system can be adjusted based on a duration that the temperature exceeds the threshold temperature. A characteristic (i.e., a memory characteristic) of the memory system can be adjusted based on values in look-up table, a fuse, or other type of data storage format that correspond to a given temperature and/or duration that the given temperature is exceeds a threshold temperature. For example, longer durations that a temperature exceeds a threshold temperature can have corresponding adjustments of characteristics that are progressively adjusted. For instance, a first duration can vary (e.g., throttle) bus traffic and/or vary (e.g., reduce) an supply voltage (e.g., as provided by a PMIC or otherwise) by a first amount while a second duration (longer than the first duration) can vary bus traffic and/or vary a supply voltage by a second amount (greater than the first) to progressively alter (e.g., reduce) the characteristic. For instance, in some embodiments, a PMIC an output a plurality voltage signals which can be adjusted based on a monitored operating temperature that exceeds the temperature threshold, the duration the monitored temperature exceeds the threshold, or a combination of the monitored operating temperature and the duration. Similarly, progressive adjustments of other characteristics based, for instance, on a duration that a temperature exceeds a threshold temperature are also possible.

In addition, determining a duration that a temperature exceeds a threshold temperature can aid with design and/or reconfiguration of a memory system. For instance, determining a duration that the threshold temperature exceeds the threshold temperature can aid with design of subsequent memory systems and/or can permit reconfiguration of an existing memory system with a different memory component. For instance, a memory systems experiencing long durations at which a temperature exceeds a threshold temperature can be reconfigured (e.g., by replacement of a DIMM and/or memory module) with a different type of memory of DIMM and/or memory module with a different thermal profile to reduce a duration that the reconfigured memory system has a temperature that exceeds the threshold temperature.

At 475, the method 470 describes the controller can determine a duration that the operating temperature exceeds the threshold temperature, as detailed herein. At 477, the method 470 describes the controller can provide data corresponding to the operating temperature and the duration to a requesting device. A requesting device can be host processor (e.g., such as a host processor of the host system 120, as described in FIG. 1) or external controller, etc. In some embodiments, the method 470 describes the controller can perform a memory operation to store (e.g., in registers of a memory device and/or in a memory array of a memory device) the data corresponding to the operating temperature and the duration that the operating temperature that exceeds the threshold temperature.

Although specific embodiments have been illustrated and as described herein, those of ordinary skill in the art will appreciate that an arrangement calculated to achieve the same results can be substituted for the specific embodiments shown. This disclosure is intended to cover adaptations or variations of one or more embodiments of the disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the disclosure includes other applications in which the above structures and processes are used. Therefore, the scope of one or more embodiments of the disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   monitoring an operating temperature of a volatile memory device;
   determining the operating temperature exceeds a threshold temperature;
   determining, based on a signal emitted by an oscillator, a duration that the operating temperature exceeds the threshold temperature;
   providing data corresponding to the operating temperature and the duration to a requesting device.

2. The method of claim 1, further comprising monitoring the operating temperature of the volatile memory device via a temperature sensor.

3. The method of claim 1, wherein the volatile memory device is coupled to a power management integrated circuit (PMIC), and wherein the PMIC is configured to output a plurality of voltage signals to the volatile memory device.

4. The method of claim 3, wherein an output voltage of the PMIC is adjusted based at least on the duration the operating temperature exceeds the threshold temperature.

5. The method of claim 3, wherein an output voltage of the PMIC is adjusted based on the operating temperature and the duration the operating temperature exceeds the threshold temperature.

6. The method of claim 1, wherein the duration is determined based on an elapsed amount of time between respective times associated with at least two temperatures of the volatile memory device.

7. An apparatus, comprising:
   a volatile memory device including:
      a volatile memory array;
      a temperature sensor;
      an oscillator configured to emit a signal; and
      a temperature tracking component configured to:
         receive operating temperatures of the volatile memory device from the temperature sensor;
         responsive to determining an operating temperature of the operating temperatures of the volatile memory device exceeds a threshold temperature, determine, based on a number of clock cycles that correspond to the signal emitted by the oscillator, a duration the operating temperature exceeds the threshold temperature;
         store, in a register of the volatile memory device, data corresponding to the operating temperature and the duration the operating temperature exceeds the threshold temperature.

8. The apparatus of claim 7, wherein the oscillator is a self-refresh oscillator configured to emit a self-refresh signal.

9. The apparatus of claim 7, wherein the temperature tracking component comprises count logic configured to count cycles based on the signal.

10. The apparatus of claim 7, wherein the volatile memory device includes a dynamic random access memory (DRAM) or a ferroelectric random-access memory (FeRAM).

11. The apparatus of claim 7, wherein the controller is further to store the data from the register of the volatile memory device in the memory array of a non-volatile memory device.

12. The apparatus of claim 7, wherein the temperature threshold is included in a plurality of temperature thresholds, and further comprising:
   comparing the monitored operating temperature to each of the plurality of temperature thresholds;
   determining the monitored operating temperature exceeds one or more of the plurality of temperature thresholds; and
   responsive to determining the monitored operating temperature exceeds the one or more of the plurality of temperature thresholds, determining a duration that the monitored operating temperature exceeds the one or more of the plurality of temperature thresholds.

13. The apparatus of claim 7, wherein the controller is further to store the data from the register of the volatile memory device in a non-volatile memory array of a non-volatile memory device in response to a power-off event.

14. A system, comprising:
   a host; and
   a memory system including:
      a volatile memory device, the volatile memory device comprising:
         a temperature sensor;
         count logic including registers; and
         an oscillator;
      a non-volatile memory device including a non-volatile memory array; and
      a controller coupled to the host and the memory system to:
         periodically monitor, via the temperature sensor, an operating temperature of the volatile memory device responsive to a signal generated by the self-refresh oscillator;
         determine the operating temperature of the volatile memory device exceeds a threshold temperature;
         determine a duration the operating temperature of the volatile memory device exceeds the threshold temperature;
         store, in a register of the volatile first memory device, data corresponding to the operating temperature and the duration the operating temperature exceeds the threshold temperature; and store the data from the register of the volatile memory device in the non-volatile memory array of the non-volatile memory device in response to a power-off event.

15. The system of claim 14, wherein the controller is to alter, based on the data corresponding to the operating temperature and the duration, a characteristic of the memory system, a characteristic of the volatile memory device, or a characteristic of the non-volatile memory device.

16. The system of claim 14, wherein the oscillator is a self-refresh oscillator configured to emit a self-refresh signal.

17. The system of claim 16, wherein the controller is to instantiate a temperature event based on a quantity of self-refresh signal emitted by the self-refresh oscillator.

18. The system of claim 17, wherein a temperature event is instantiated for each self-refresh-signal emitted by the self-refresh oscillator.

* * * * *